2 Sheets—Sheet 1.
T. QUINLIVAN.
Thrashing-Machine.
No. 223,536. Patented Jan. 13, 1880.
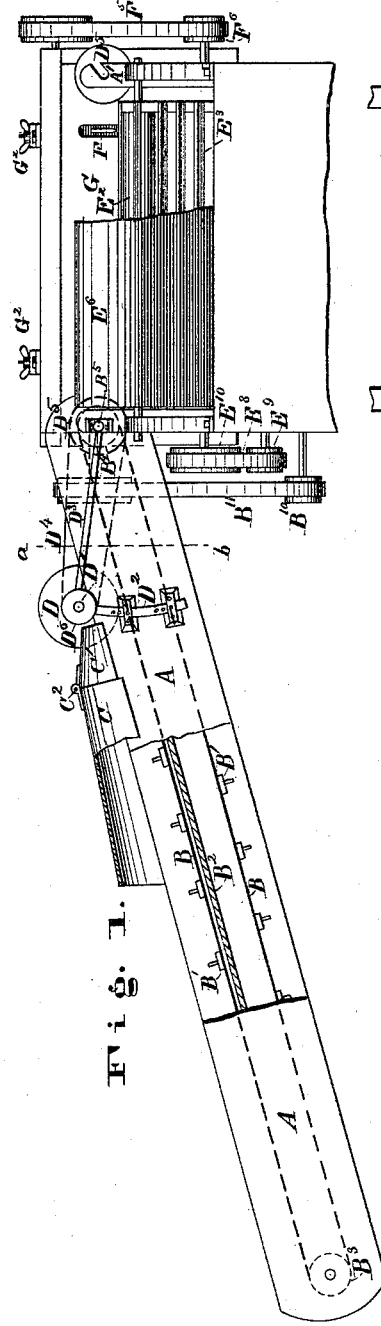
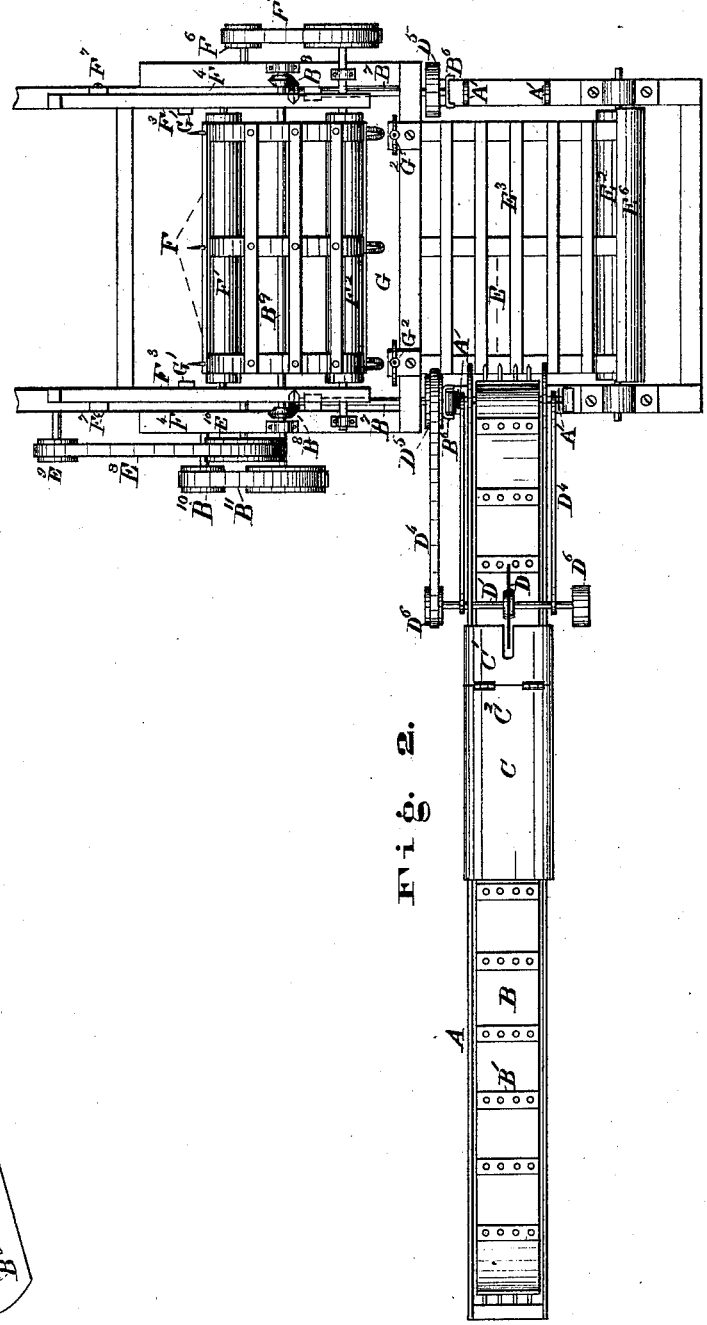
WITNESSES:
T. S. West
Cornelius Cot
INVENTOR:
T. QUINLIVAN,
BY H. W. Beadle & Co.
ATTYS 2 Sheets—Sheet 2.
T. QUINLIVAN.
Thrashing-Machine.
No. 223,536. Patented Jan. 13, 1880.
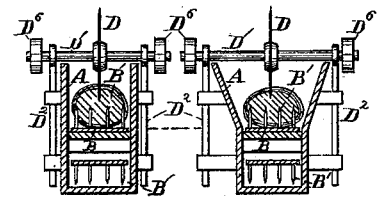
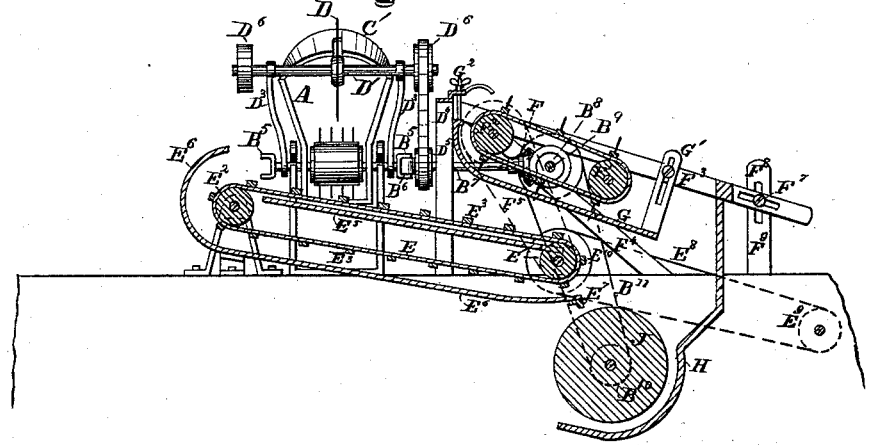
WITNESSES:
J. S. West
Cornelius Cot
INVENTOR:
T. QUINLIVAN,
BY H. W. Beadle & Co.
ATTYS.

UNITED STATES PATENT OFFICE.

THOMAS QUINLIVAN, OF COGHILL'S CREEK, VICTORIA.

THRASHING-MACHINE.

SPECIFICATION forming part of Letters Patent No. 223,536, dated January 13, 1880.

Application filed September 5, 1879.

*To all whom it may concern:*

Be it known that I, THOMAS QUINLIVAN, of Coghill's Creek, in the British Colony of Victoria, farmer, have invented new and useful Improvements in and connected with Thrashing-Machines, which improvements are fully set forth in the following specification, reference being had to the accompanying drawings.

The nature of my invention consists in the combination of the sheaf-carrier of a thrashing-machine with a mechanical arrangement for regulating the supply to the beaters of the thrasher.

The sheaf-carrier consists of a wooden trough containing an endless india-rubber band carrying spiked cross-laths. Near the machine end of this trough I place a revolving band-cutter, and just before reaching this I cover said trough with a sheet-iron bonnet, so as to direct the sheaves under the band-cutter; and I also hinge to said fixed bonnet a small subsidiary movable bonnet, for the purpose of preventing the stalks from getting into the bearings of the band-cutter shaft.

My arrangement for regulating the supply to the beaters of the thrasher consists in an endless traveling platform made of three parallel belts carrying transverse cross-laths for conveying the loose stuff supplied to it by the sheaf-carrier underneath a slotted iron screen or shield, through which project the teeth of an adjustable endless traveling rake constructed on the same principle as the platform. The extent to which these teeth project through said shield is determinable by adjusting-screws, and the farther they project and the closer the traveling rake is adjusted to the feeding-platform the smaller is the amount of stuff supplied to the beaters. Besides regulating the supply, the traveling rake also spreads the stuff to some extent.

Referring to the drawings hereto attached, Figure 1 shows end elevation of the upper part of a thrashing-machine with my sheaf-carrier attached; Fig. 2, plan of same; Fig. 3, cross-section of sheaf-carrier on line $a\,b$ in Fig. 1. Fig. 4 is a section of the upper part of a thrashing-machine, showing my mechanical arrangement for regulating the supply to the beaters of the thrasher.

A is the wooden trough, hinged at A', and containing endless india-rubber band B, on which are spiked cross-laths B'. This band travels over and is supported on wooden platform $B^2$, and also travels over rollers $B^3$ and $B^4$. Each end of spindle $B^5$ terminates in a T-piece, one of which gears into a forked clutch, $B^6$, at the end of short spindle $B^7$, which is driven by bevel-gearing $B^8$ from shaft $B^9$, which receives its motion from the drum-spindle $B^{10}$ by means of belt $B^{11}$. On the opposite side of the machine is a similar set of forked clutch, spindle, and bevel gearing, so as to provide for the sheaf-carriers being affixed to the opposite side of the machine, only in this case the bevel-gearing is so set as to run in the opposite direction.

C is a fixed sheet-iron bonnet. C' is a movable sheet-iron bonnet hinged at $C^2$. D is a revolving band-cutter, and D' its spindle, supported on segmental pieces $D^2$, and connected by radius-bars $D^3$ to the gudgeons, through which works spindle $B^5$. It is driven by belt $D^4$ from pulley $D^5$ on spindle $B^7$, which passes over pulley $D^6$. There is a counterpart to pulley $D^6$ on the other end of spindle D', so as to provide for its being driven from that side in the event of the sheaf-carrier being affixed to the opposite side of the machine.

E is the endless platform, traveling around sets of pulleys at each end, (marked E' and $E^2$, respectively.) $E^3$ $E^3$ are the transverse cross-laths. $E^5$ is a stationary supporting wooden platform, and $E^6$ is a sheet-iron shield. $E^7$ is a piece of angle-iron, running from side to side of the machine, for clearing the drum from any straw that may cling to it. Motion is imparted to this platform by means of belt $E^8$ from pulley $E^9$ on horner-spindle passing around pulley $E^{10}$ on spindle of pulleys E'.

F is the endless rake, traveling around a pulley at each end, (marked respectively F' and $F^2$,) the former being supported in bearings on adjustable frame $F^3$ and the latter in bearings on fixed frame $F^4$. Motion is imparted to this rake by means of belt $F^5$ gearing around small pulley $F^6$ on spindle of pulleys E'. The frame $F^3$ is adjusted by means of set-screw $F^7$, working in slot $F^8$ in vertical standard $F^9$, the spindle of pulley $F^2$ being the fulcrum on which it works.

G is a slotted sheet-iron shield, through the slots in which the teeth of the rake work. This shield is adjustable by means of its supports G' and G², the former passing through guides in the adjustable framing F³ and being fastened by a set-screw, and the latter passing through an eye on the fixed framing and being fastened by a nut.

H is a shield or guide to conduct the straw to the thrashing-drum J.

The mode of operation is as follows: The sheaves are placed, one at a time, in the sheaf-carrier A, which conveys them under the revolving band-cutter D, where the bands are cut, and the loose sheaf is then delivered onto endless traveling platform E, which carries it under the endless rake F into the thrashing-drum.

It will be noticed that by reason of the sheaf-carrier being hinged it can accommodate itself to any height of stack, or can raise the sheaves from the ground, if so required. It will also be noticed that provision is made for the removal of this carrier from one side of the machine to the other, as may be most convenient.

By the use of my improvements a considerable saving in labor is effected and all danger to human life and limb prevented.

I do not confine myself to the size, shape, or materials of which my improvements may be made or manufactured, although in these particulars I have shown and described those which I prefer.

I claim—

In combination with the carriers, the endless traveling platform E, the endless adjustable rake F, and slotted adjustable shield G, as described.

T. QUINLIVAN.

Witnesses:
L. JONES,
A. W. MITCHELL.